United States Patent [19]

Johansson

[11] 4,202,259
[45] May 13, 1980

[54] CONVECTION OVEN

[75] Inventor: Leif A. T. Johansson, Huddinge, Sweden

[73] Assignee: Tipe Revent AB, Stockholm, Sweden

[21] Appl. No.: 958,331

[22] Filed: Nov. 7, 1978

[30] Foreign Application Priority Data

Nov. 29, 1977 [SE] Sweden ................. 7713504

[51] Int. Cl.² ............................................. A47J 37/00
[52] U.S. Cl. ........................................ 99/352; 99/447; 99/443 R; 99/479; 126/20
[58] Field of Search .................. 99/443 R, 467, 473, 99/474, 477, 479, 352, 447; 126/348, 369, 20, 20.1, 20.2, 359

[56] References Cited

U.S. PATENT DOCUMENTS

| 1,878,519 | 9/1932 | Hoppe ........................... 126/20 |
| 3,826,240 | 7/1974 | Miyahara ....................... 126/359 |
| 3,954,053 | 5/1976 | Johansson ..................... 99/443 R |

Primary Examiner—Billy J. Wilhite
Attorney, Agent, or Firm—Hill, Van Santen, Steadman, Chiara & Simpson

[57] ABSTRACT

A convection oven has a chamber receptive of a rack across which heated air is circulated. At the downstream side of the air path through the chamber there is a steam generator having a heat accumulator comprising blocks of high thermal conductivity carried on a series of carriers arranged in a parallel superposed vertical stack. At the outset of a baking cycle, water is caused to flow downwardly within the vertical stack against the blocks to generate steam and water vapor which is circulated across the unheated product being baked to control the browning and crispiness of its outer surface.

10 Claims, 3 Drawing Figures

CONVECTION OVEN

BACKGROUND OF THE INVENTION

1. Field of the Invention

This invention relates to a convection oven, such as may be used in commercial bakeries.

2. Prior Art

My U.S. Pat. No. 3,954,053 discloses a convection oven of the rack type. It is also known to inject steam or water vapor into the oven chamber at the start of baking, both in conveyorized ovens and in rack or other types of ovens that work on a batch basis.

When bread is baked in a convection oven, namely in an oven in which the bread is contacted by flowing hot air, it has been known to introduce water vapor or steam into the oven atmosphere for a brief interval at the initial phase of the baking process before the oven atmosphere is caused to circulate. This step aids in obtaining the desired color and crispiness of the crust of the bread.

Swiss Pat. No. 532,363 produces steam within the oven by spraying water on the walls of steaming chambers which are heated by the circulating air.

In Swiss Pat. No. 548,161, there is disclosed a steam or water generator which utilizes a separate independent heater for each steam generator.

In U.S. Pat. No. 2,767,667, a conveyorized oven has a steaming unit disposed at the entry end of a conveyor and uses a steam generator which is remote from the conveyor or coveyor housing to provide steam for direct application to the bread, there being a second fan for producing steam circulation which flows over the entering bread remote from the conveyorized baking portion of the device.

The application of steam or hot water vapor must be effected during a rather short period of time, and difficulties have been encountered in the past in providing a sufficient amount of vaporized water.

SUMMARY OF THE INVENTION

Accordingly, it is an object of the invention to provide in a non-conveyorized convection oven, such as a rack oven, a steam generating device which is not remote from the oven chamber, which uses no independent source of steam and which needs no secondary fan for forcing circulation, but which is capable of rapidly vaporizing large amounts of water without use of any auxiliary heaters.

According to the present invention, a convection oven has heated-air circulating means that forces air through an oven chamber, and at the discharge side of such chamber, there is disposed a steam generator that includes a heat accumulator having a high thermal conductivity, and which utilizes blocks such as metal balls arranged in a vertical plane at the discharge side of the oven chamber. The blocks are continually exposed to the circulated heated air to store heat energy therein, and at the start of an operating cycle of the oven, water is caused to flow over such blocks to discharge steam and water vapor.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
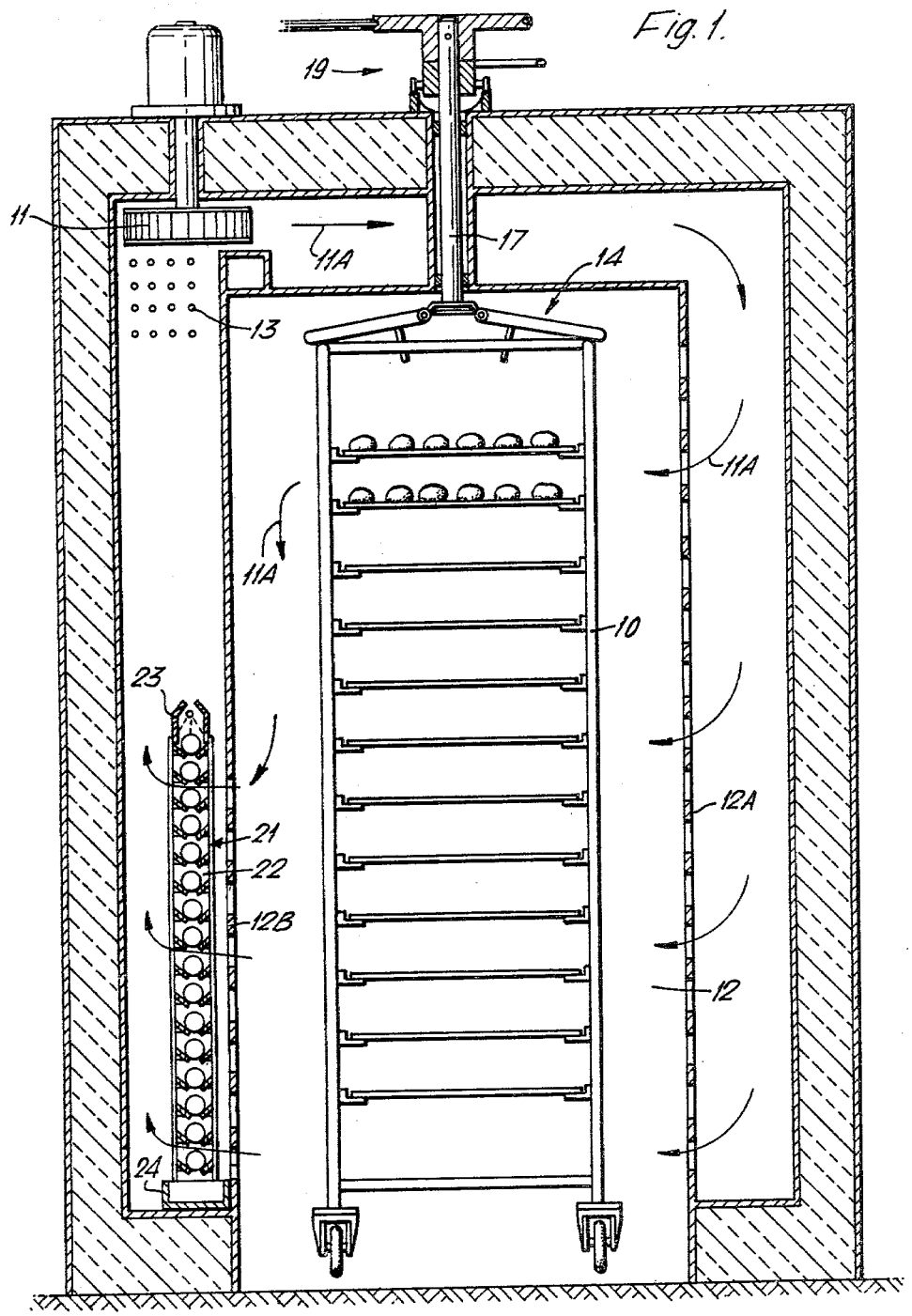
FIG. 1 is a vertical cross-sectional view of an oven embodying the invention.

The principles of the present invention are particularly useful when embodied in a convection oven such as shown in FIG. 1. The oven has an oven chamber 12 of parallelepiped configuration with rectangular sides including an apertured upstream side 12A and a partially apertured downstream side 12B. Disposed within the chamber 12 is a rack 10 connected at its upper end to a driver 14 carried by a vertical shaft 17 which can be rotatably driven and which can be lowered from its illustrated position by a shift mechanism 19. The oven includes heated-air circulating means that moves air in a closed path, such movement being effected by a fan 11 that moves heated air in a direction indicated by several arrows 11A through such path, and thence to a heater 13 where the air is reheated before it enters the inlet of the fan 11. Reference is hereby made to my earlier U.S. Pat. No. 3,954,053 for a more detailed description of the general aspects of the known oven, the disclosure of which patent is incorporated herein by reference. The goods to be baked are carried on plates or pans held by the rack 10 which is rolled in and out of the oven chamber 12, the chamber being closed by a door (not shown). Thus there is a section of the flow path for air defined between the vertical thermally insulated casing of the oven and the spaced side-walls 12A, 12B. The shift mechanism 19 enables raising and lowering the driver 14 and the rack 10, thereby enabling the shaft 17 to rotate the rack 10.

Figure 2:
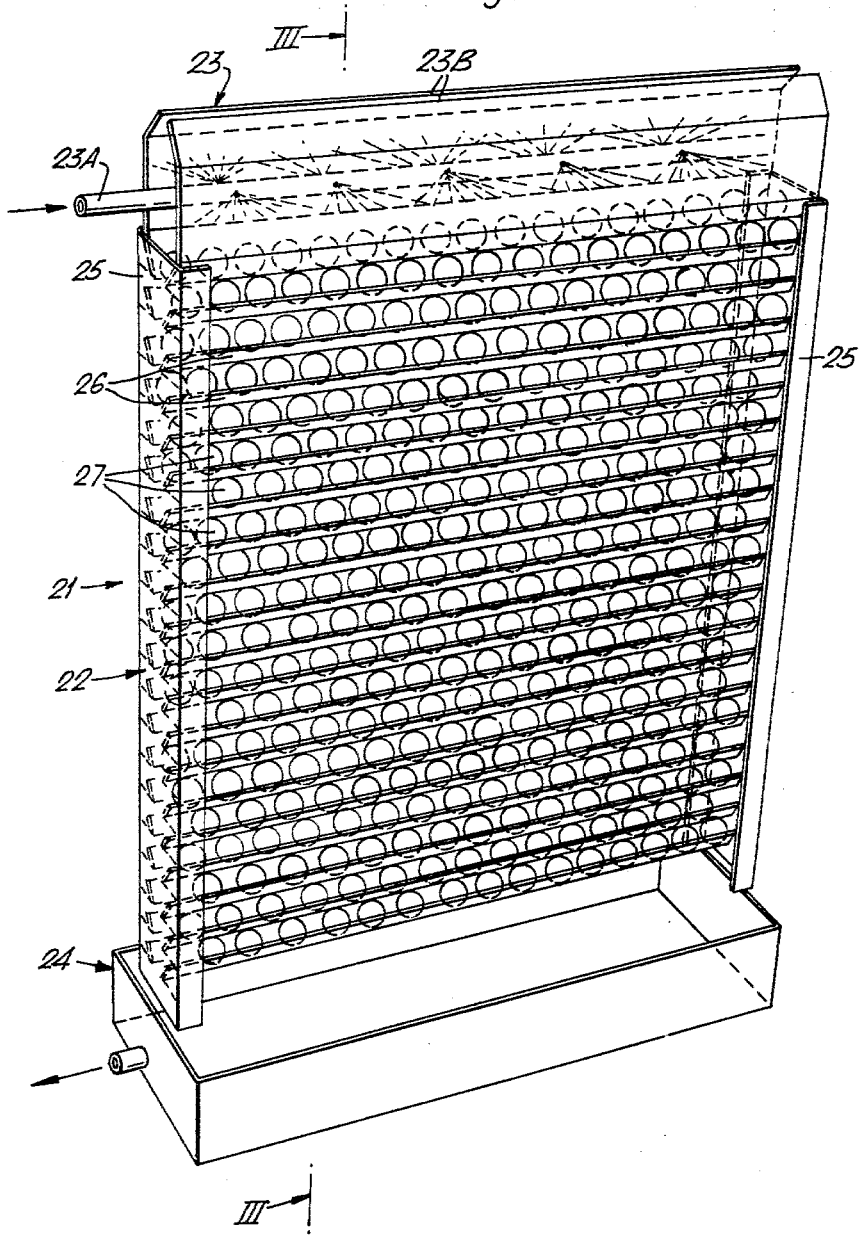
FIG. 2 is an enlarged perspective view of the steam generator of the oven shown in FIG. 1.
Figure 3:
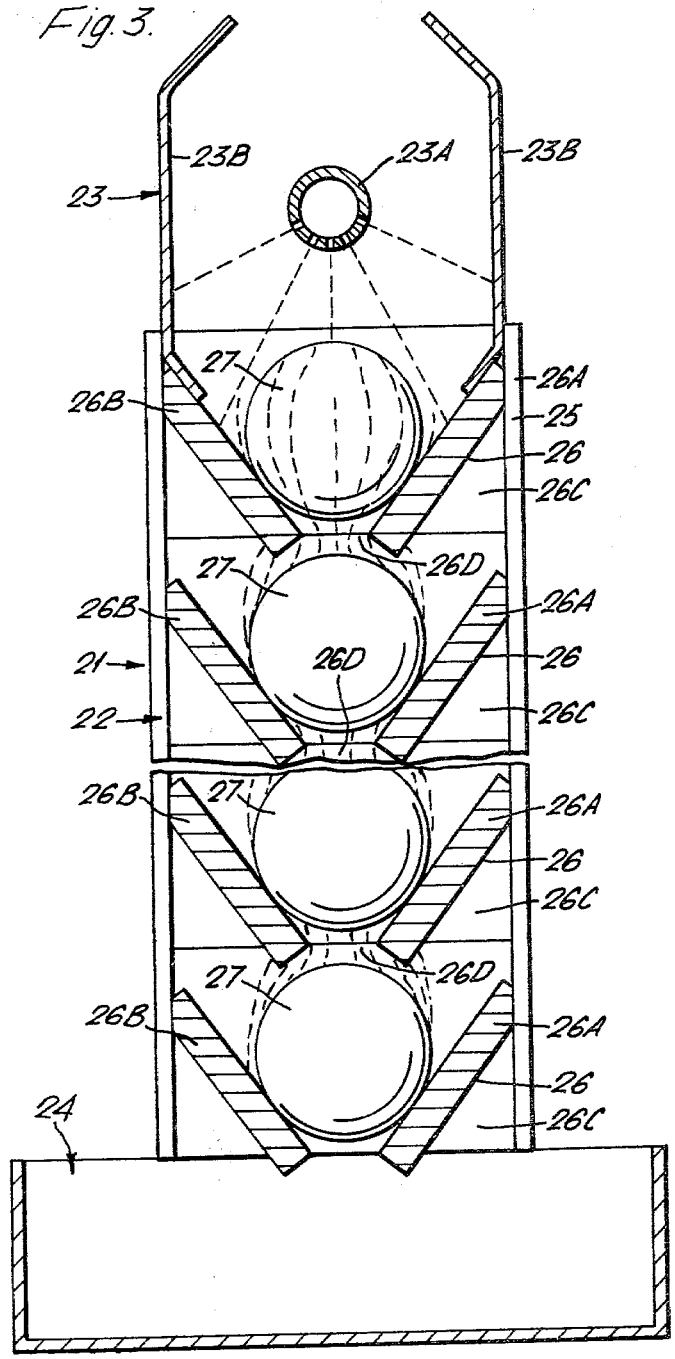
FIG. 3 is an enlarged vertical cross-sectional view taken generally along line III—III of FIG. 2.

Outside the sidewall 12B of the oven chamber 12 on the side of the oven chamber where the air leaves it, there is a steam generator 21, shown in greater detail in FIGS. 2 and 3.

The steam generator 21 comprises a base 24 above which there is a holder 25 carrying a heat accumulator 22 above which a water spreading means 23 is disposed.

The base 24 serves as a sump for collecting and draining away any excess water. As best shown in FIG. 2, the holder 25 comprises a pair of horizontally spaced vertical holder channels that open toward each other.

The heat accumulator 22 of the steam generator 21 comprises a series of carriers 26 which extend horizontally in parallel relation to each other and which are superposed above each other to form a vertical stack of carriers 26 disposed substantially in a vertical plane. If desired, more than one such stack may be provided in immediately adjacent planes.

Each carrier 26 comprises a pair of bars 26A, 26B that have upper surfaces that define downwardly sloping sides that terminate in lower longitudinal edges, such edges of the bars 26A, 26B defining a longitudinal opening 26D therebetween, and above which there is provided a block-receiving channel. If desired, the structure may be modified to have more than one such block-receiving channel. The bars 26A, 26B, are secured to a pair of end plates 26C shown in FIG. 3 as by welding. The upper and lower edges of each end plate 26C support the lower and upper edges of the corresponding end plates of any adjacent carriers. The bars 26A, 26B also have upper longitudinal edges that lie adjacent to a horizontal plane through the lowermost edges of the bars of the next higher carrier 26. The lowermost longitudinal edge of each bar 26A, 26B projects slightly below the lower edge of the end plate 26C so that the bars 26A, 26B can nest between the end plates 26C, 26C of the next lower carrier 26. As the holder 25 has channels that face each other, it has channel legs that embrace the vertically arranged sets of end plates 26C. If desired, the steam generator 21 can be constructed with the base 24, the holder 25, the heat accumulator 22, and the water spreading means 23 joined together or unified for handling as a unit.

The water spreading or spraying device 23 includes a tube 23A that is suitably apertured and is connected or connectable to a source of water, there being a pair of deflector plates 23B, 23B, best shown in FIG. 3, for guiding the flow of water in a downward direction, water flow being shown in dashed lines.

Within the block-receiving channel of each of the carriers 26, there is disposed a multiplicity of blocks 27, illustrated here as being metal balls. Preferably the entire heat accumulator 22 is constructed of material that has a high thermal conductivity, and this requirement is particularly necessary for the blocks 27, here shown as metal balls, but which may have other shapes. To that end the term "blocks" is not intended to be restricted to any configuration having a right angle, but is used in a more generic sense.

The heated-air circulating means is caused to operate whereby hot air passes through the heat accumulator 22 to store heat energy therein. Thereafter, the rack 10 with its articles to be baked is inserted and the oven chamber 12 is closed. With the fan 11 stopped or substantially stopped, water is sprayed by the water spreading means 23 onto the heat accumulator 22. The parts of the heat accumulator 22 do not need to meet any severe demands as to strength, dimensional accuracy, resistance to corrusion and wear, and the like, and they may therefore be made at low cost from inexpensive materials, such as low-grade steel.

Sprayed water flows downwardly being deflected possibly by the deflector plates 23B and also guided by the various bars 26A, 26B which function not only for block or ball retention, but also function to retain water, but not water vapor or steam.

The water that emerges from the tube 23A is distributed substantially uniformly over the length of the various carriers 26.

As shown in FIG. 2, the various balls 27 lie loosely in and substantially fill the carriers 26. They need not be precisely aligned vertically with each other so that there are in some instances spaces between adjacent balls, and there may be another ball lying immediately below such space in the next carrier 26. A portion of water is immediately vaporized while the remainder flows through the slot-shaped opening 26D of the uppermost carrier 26 and is distributed over the balls 27 of the next lower carrier 26. The water that is flowing on the upper surfaces of the bars 26A, 26B tends to spread out evenly so that water drips therefrom as a thin film that can thus flow over the entire surface areas of the balls. This operation coupled with the high thermal conductivity of the balls results in a rapid evaporation of the water. There is also a tendency for the water that is first supplied to be vaporized primarily at the uppermost carrier or carriers 26. Thereafter, other subsequently supplied water becomes preheated and is vaporized at a lower portion of the heat accumulator 22. Any water that is not vaporized flows into the sump of the base 24.

The water vapor and steam that is produced by itself spreads in the circulation path and fills the oven chamber 12 and condenses on the dough pieces on the rack 10 which are still cool.

When the steaming has been completed, the fan 11 is energized and it causes the air to circulate and absorb heat from the heater 13. The heat accumulator 22, which was cooled because of the steam generation, then again starts accumulating heat. The construction of the heat accumulator 22 allows the air emerging from the oven chamber to pass through it without causing an undue resistance to the airflow, but due to the ball-shaped blocks 27, it nevertheless has such a large heat transfer surface area that the entire mass thereof is rapidly heated to a temperature near that of the air even though it previously was cooled by water.

After the steaming portion of the cycle, the heat accumulator 22, on being reheated during the baking cycle, causes an appreciable cooling of the air flowing through it, especially at the outset, and since the heat accumulator 22 has been cooled differently at different levels, the air passing therethrough will be cooled to different temperatures, depending upon where the air passes through the heat accumulator 22. However, since the air passes through the fan 11 after it has passed through the heat accumulator 22, it will be thoroughly mixed while it is being reheated before it reaches the inlet or upstream side of the oven chamber 12 so that the air has the same temperature over the entire area where it enters the oven chamber 12 through the side wall 12A. Thus the disposition of the heat accumulator 22 at the outlet or downstream side of the oven chamber 12 avoids any tendency to produce uneven heat distribution over the height of the oven chamber. The steam generating device shown on the drawings is only an exemplary embodiment, and thus various minor modifications may be suggested by those versed in the art. It should be understood that I wish to embody within the scope of the patent warranted hereon, all such embodiments as reasonably and properly come within the scope of my contribution to the art.

I claim as my invention:

1. A convection oven, comprising:
    (a) means defining an oven chamber receptive of a load as a batch;
    (b) means for circulating heated air in a closed path extending substantially horizontally through said oven chamber;
    (c) a multiplicity of blocks disposed outside said oven chamber in a substantially vertical plane in said closed path, said plane being transverse to the direction of the air flow through said oven chamber, the material of said blocks having a high thermal conductivity; and
    (d) means for spreading water over said blocks only at the start of a baking cycle;
    whereby during the remainder of the cycle said air flow effects reheating of the blocks for use with the next batch by direct engagement of said air flow with said blocks.

2. An oven according to claim 1, including a plurality of superimposed parallel substantially horizontal carriers, each supporting a plurality of said blocks.

3. An oven according to claim 2, each of said carriers having a block-receiving channel, there being a longitudinally extending opening along the bottom of the channel.

4. An oven according to claim 3, said channel having downwardly sloping sides having lower edges defining said longitudinal opening centrally beneath the blocks supported thereon.

5. An oven according to claim 4, said sloping sides having upper longitudinal edges disposed adjacent to a horizontal plane extending through the lowermost edges of the next higher one of said channels.

6. An oven according to claim 2, including a holder supporting a vertical stack of said carriers disposed one upon the other therein.

7. An oven according to claim 1, said blocks being metal balls.

8. An oven according to claim 1, said air circulating means including a fan, said vertical plane of blocks being disposed between the downstream side of said oven chamber and the air inlet to said fan.

9. An oven according to claim 4, including a pair of bars having upper surfaces defining said sloping sides, and a pair of end plates respectively secured to the opposite ends of said bars, the upper and lower edges of said end plates respectively supporting the lower and upper edges of the end plates of any adjacent carriers.

10. An oven according to claim 9, including a holder having a pair of horizontally spaced vertical holder channels, each respectively embracing a superposed stack of said end plates.

* * * * *